US 8,477,658 B2

(12) United States Patent
Tsang et al.

(10) Patent No.: US 8,477,658 B2
(45) Date of Patent: Jul. 2, 2013

(54) INTELLIGENT PEER-TO-PEER MEDIA STREAMING

(75) Inventors: Danny Hin Kwok Tsang, Hong Kong (CN); Hao Luan, Hong Kong (CN); Kin Wah Kwong, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 606 days.

(21) Appl. No.: 11/740,252

(22) Filed: Apr. 25, 2007

(65) Prior Publication Data
US 2007/0280255 A1 Dec. 6, 2007

Related U.S. Application Data

(60) Provisional application No. 60/794,462, filed on Apr. 25, 2006.

(51) Int. Cl.
*H04L 12/28* (2006.01)
*H04L 12/56* (2006.01)
*H04L 12/46* (2006.01)

(52) U.S. Cl.
CPC ............ *H04L 45/02* (2013.01); *H04L 12/4604* (2013.01)
USPC ........ 370/255; 370/254; 370/395.2; 370/408; 709/227; 709/231; 709/232; 709/252

(58) Field of Classification Search
None
See application file for complete search history.

(56) References Cited

U.S. PATENT DOCUMENTS

| | | | |
|---|---|---|---|
| 5,946,316 A * | 8/1999 | Chen et al. .................... | 370/408 |
| 7,142,859 B2 | 11/2006 | Nishimura et al. | |
| 7,174,334 B2 | 2/2007 | Cherkasova | |
| 7,184,071 B2 * | 2/2007 | Chellappa et al. .............. | 348/46 |
| 7,400,577 B2 | 7/2008 | Padmanabhan et al. | |
| 7,401,132 B1 * | 7/2008 | Krumel et al. ................ | 709/220 |
| 7,409,325 B2 * | 8/2008 | Morara ............................ | 703/2 |
| 7,417,973 B1 | 8/2008 | Whitby-Strevens | |
| 7,515,551 B2 | 4/2009 | Cook et al. | |
| 7,577,110 B2 | 8/2009 | Zimmermann et al. | |
| 7,633,873 B1 * | 12/2009 | Kohler et al. ................. | 370/238 |
| 7,719,988 B1 * | 5/2010 | Ruiz et al. ..................... | 370/238 |
| 7,805,518 B1 * | 9/2010 | Kamvar et al. ............... | 709/227 |
| 7,852,786 B2 * | 12/2010 | Wang et al. .................... | 370/254 |
| 2001/0043516 A1 * | 11/2001 | Gelfer et al. ................ | 369/30.06 |
| 2002/0184357 A1 * | 12/2002 | Traversat et al. ............. | 709/223 |
| 2003/0167337 A1 * | 9/2003 | Liew et al. ..................... | 709/231 |
| 2003/0182428 A1 * | 9/2003 | Li et al. .......................... | 709/227 |
| 2004/0098447 A1 * | 5/2004 | Verbeke et al. ............... | 709/201 |
| 2004/0122903 A1 * | 6/2004 | Saulpaugh et al. ........... | 709/206 |
| 2004/0143672 A1 | 7/2004 | Padmanabham et al. | |
| 2004/0265784 A1 * | 12/2004 | Stout ............................ | 434/433 |
| 2005/0086469 A1 * | 4/2005 | Dunagan et al. .............. | 713/163 |
| 2005/0152293 A1 * | 7/2005 | Nanda et al. .................. | 370/310 |

(Continued)

OTHER PUBLICATIONS

Kwong et al., "On the Relationship of Node Capacity Distribution and P2P Topology Formation", 2005, IEEE, pp. 123-127.*

(Continued)

*Primary Examiner* — Ayaz Sheikh
*Assistant Examiner* — Peter Chau
(74) *Attorney, Agent, or Firm* — Turocy & Watson, LLP

(57) ABSTRACT

An efficient media streaming method utilizing a globally load balanced overlay network. This method makes use of capacity per out-degree values to construct and maintain an overlay network for media streaming in a Peer-to-Peer environment.

26 Claims, 5 Drawing Sheets

U.S. PATENT DOCUMENTS

| | | | |
|---|---|---|---|
| 2005/0155072 A1* | 7/2005 | Kaczowka et al. | 725/95 |
| 2005/0157665 A1* | 7/2005 | Nanda et al. | 370/294 |
| 2005/0201405 A1* | 9/2005 | Liu et al. | 370/432 |
| 2006/0184688 A1* | 8/2006 | Ganguly et al. | 709/232 |
| 2006/0190615 A1* | 8/2006 | Panwar et al. | 709/231 |
| 2006/0215588 A1 | 9/2006 | Yoon | |
| 2006/0224813 A1* | 10/2006 | Rooholamini et al. | 710/316 |
| 2007/0189290 A1* | 8/2007 | Bauer | 370/390 |
| 2008/0043634 A1* | 2/2008 | Wang et al. | 370/252 |
| 2009/0019141 A1* | 1/2009 | Bush et al. | 709/223 |

OTHER PUBLICATIONS

Tsoumakos et al., "Adaptive Probabilistic Search for Peer-to-Peer Networks", 2003, IEEE, Proceedings of the Third International Conference on Peer-to-Peer Computing (P2P'03).*

Egashira et al., "Distributed Service Discovery using Preference", 2005, IEEE.*

Tsang et al., "A Congestion-Aware Search Protocol for Unstructured Peer-to-Peer Networks", 2004, Springer-Verlag Berlin Heidelberg, pp. 319-329.*

Nazanin Magharei and Reza Rejai, "Understanding Mesh-based Peer-to-Peer Streaming", Proceedings of the International Workshop on Network and Operating Support for Digital Audio and Video, Newport, Rhode Island, May 2006.

Vidhyashankar Venkataraman, Kaouru Yoshida, Paul Francis, "Chunkyspread: Heterogeneous Unstructured Tree-based Peer-to-Peer Multicast", The Fourteenth IEEE International Conference on Network Protocols, Nov. 2006.

Yu-Wei Sung, Michael Bishop, and Sanjay Rao, "Enabling Contribution Awareness in an Overlay Broadcasting System", Proceedings of ACM SIGCOMM 2006, Pisa, Italy, Sep. 2006.

OA dated Apr. 5, 2010 for U.S. Appl. No. 11/942,257, 36 pages.

OA dated Sep. 17, 2010 for U.S. Appl. No. 11/942,257, 39 pages.

Castro et al. "Splitstream: High Bandwidth Multicast in Cooperative Environments", SOSP, Oct. 2003, pp. 1-5.

Castro et al. "SCRIBE: A lagre-scale and decentrelized application level multicast infrastructure", IEEE, Oct. 2002, vol. 20, No. 8, pp. 100-104.

OA dated Sep. 15, 2011 for U.S. Appl. No. 11/942,257, 52 pages.

* cited by examiner

Figure 5

Algorithm 1 Routing Algorithm of Random Walks

Walker starts at $x_0$ and is randomly forwarded to a peer $x_1 \in V_{x_0}$
// Forward the walkers for TTL steps
for $i = 1$ to $TTL - 1$ do
  // Choose a candidate from the peers in $V_{x_i}$
  // Select the candidate from the neighbor set $V_{x_i}$ with the proposal probability $q(x_i, x_j)$
  $x_{Cand} \Leftarrow selectCandidate(V_{x_i}, q(x_i, x_j))$;
  // Accept the chosen candidate with the acceptance probability
  if $acceptCandidate(\alpha(x_{Cand}, x_i)) == true$ then
    $x_{i+1} \Leftarrow x_{Cand}$
  else
    $x_{i+1} \Leftarrow x_i$
  end if
end for
Stay at $y \Leftarrow x_{TTL}$ and connect $x_0$ to $y$

INTELLIGENT PEER-TO-PEER MEDIA STREAMING

BACKGROUND AND SUMMARY OF THE INVENTIONS

The present application relates to Peer-to-Peer (P2P) communications, and more particularly to the cooperation of end hosts in forming overlay topologies in a P2P networking environment for the distribution of multimedia contents, such as bulk files, live or on-demand audio or video, etc.

Background: Media Streaming

The idea of Peer-to-Peer is by leveraging on the end terminals to cooperatively disseminate the information instead of relying on any central entities. Such feature endows the system's theoretically infinite scalability with virtually no additional cost, and therefore has ignited an explosive growth of large scale Internet services, for instance, KaZaA for file sharing, BT for bulk content distribution and PPlive for live media streaming.

FIG. 1 shows an example of a general architecture of the peer-to-peer streaming systems. The original uncompressed video content is generated by the A/V source and injected into the media server. In the media server, the video content is first compressed with the playout rate to be r kbps and then is distributed to users in the peer-to-peer network through multiple video streams. In the peer-to-peer network, the video streams are forwarded among connected nodes, and at each node the downloading video content is simultaneously played by the local media player at the playout rate of r kbps.

An appealing feature of the peer-to-peer networking is that since each participating node contributes its bandwidth to the system to assist uploading, the system can self-scale to support a huge number of users online simultaneously, even for bandwidth consuming media steaming applications. Notice that all these attractive services are bandwidth intensive and normally require stringent QoS requirements. On the other hand, with millions of heterogeneous participants all over the world, how to organize the network efficiently to boost the system performance with high service quality is really a tough problem. Facing these difficulties traditional approaches for live media streaming can mainly be groped into three categories based on the involvement of (1) a multicast tree, (2) plural multicast trees, or (3) no tree.

The first category is to build a multicast tree across the network. Video contents are disseminated from the root and passed along the tree from parents to children. Without considering about the dynamic behavior of peers, this mechanism is superior with its ease to manage. Optimization can also be easily performed within the tree by intelligently shifting among parents and their children. However, with the intense churns of ad hoc peers, the cost of tree topology maintenance is high. Further, due to peer departures, the system often needs frequent repairs. Therefore participants will inevitably encounter turbulent QoS with large video quality fluctuation during the repairing phase. Examples of such systems include Narada and Yoid.

To enhance the robustness of the system and allow the clients to enjoy high quality services such as smooth playing of videos, the second category improves the first category by building several multicast trees simultaneously with each tree streaming one strip of the content rooted front a source. Such mechanism often employs the advanced coding schemes, e.g. Multiple Description Coding or Fountain Codes, so that by downloading several streams simultaneously from different trees, the participants are able to achieve better video quality and can also tolerate the departures of partial predecessors as long as it call download at least one stream continuously. Such mechanism has been adopted in CoopNet SplitStream and Bullet.

In the third category, there are no more tree(s) to be maintained. Instead a data-oriented approach chops the original contents into blocks of equal size and disseminates to peers disjointedly. After downloading each block in its entirety, peers can then serve it to other siblings to enhance the system service capacity. In such a scenario, in order to learn the block propagation to chase needed blocks, each peer needs to collect the block information of certain amount of peers periodically and react against the run up of fresh blocks or other accidents such as neighbor departures, heavy congestion, etc. With the unceasingly active local modifications, the network commotion will only affect several block sessions of a peer normally and therefore the system is more robust than that of the previous tree(s) structure. For this reason, the data driven approach is widely employed in practice, for instance BT, CoolStream and PPlive. However, such mechanism makes the network even more turbulent and difficult to optimize.

With the great success of PPlive and CoolStream, large scale live streaming service has already been relatively mature. However, the term "streaming" is in fact used loosely and inaccurately. There are no general principles to guide designers seeking foe an optimal system. Large scale Video-on-Demand (VoD) service, with more stringent QoS requirements and less available cooperation among peers, is far satisfaction and still under serious research without any real system implemented.

To summarize, due to the distinguished characteristics of the P2P networks, efficiently utilizing the overall bandwidth resource encounters great engineering challenges in the following three aspects.

1. Unpredictable and Dynamically Changing Overall Bandwidth. Let $V_t$ denote the set of peers in the network at time t, including the server. Let $C_t$ denote the upload capacity of each participating peer $i \in V_t$. Then the overall bandwidth available is $\Sigma_{i \in V_t} C_i$. Since the media player requires downloading rate at least r to play the video content smoothly, the overall download bandwidth is at least $|V_t|r$, excluding the server. Therefore, it constructing the streaming system, a Necessary Condition is $\Sigma_{i \in V_t} C_i \geq (|V_t|-1)r$. Therefore, the fundamental problem is how to control the system to satisfy the necessary condition. Solving this problem faces great challenges: First, due to the huge number of dynamic and heterogeneous peers involved in the network, the overall bandwidth, i.e., $\Sigma_{i \in V_t} C_i$, is unpredictable. Second, the average overall bandwidth is changing all the time because participants are widespread over the world and have heterogeneous bandwidth capacities. With the asynchronous nature of this situation, peers access the network at different times. Thus, the available bandwidth of the network is dynamically changing with the different mix of peers.

2. Bandwidth Heterogeneity and Bottleneck Effects. Even with a feasible playout rate r to satisfy $\Sigma_{i \in V_t} C_i \geq (|V_t|-1)r$, another key issue is to provide particular peers with satisfactory downloading rate so that they can play the video smoothly at the given rate r. As a simple example shown in FIG. 2(a), a video stream is pumped out from the source node S to four participating nodes, A, B, C and D. In this example, the overall bandwidth available is 600 which should be plenty to simultaneously support the four users to play the video at the rate of 100. However, since peer C is overloaded, it becomes a bottleneck peer in streaming. Accordingly, all the downstream nodes suffer with the throttled downloading rates and are not able to play the video at the desired rate. How can the same video be delivered by a different network is as the example shown in FIG. 2(b). This network balances the upload workload of the four participating peers, where the bottleneck peers are eliminated and all the peers can now play the video smoothly. To fully utilize the overall bandwidth for video delivery, the above two examples show the fundamental problem of how to accommodate the bandwidth heterogeneity of peers and eliminate the bottleneck effects from video streaming.

3. Low Cost and Effective Adaptation in Highly Dynamic Systems. With peers frequently joining and departing from the network, another challenging problem is how to continuously adapt the overlay network to maintain the necessary condition and high bandwidth utilization at the same time. Further, since a peer-to-peer streaming network normally involves a huge number of peers online simultaneously, the construction and adaptation of overlay must take place in a completely distributed manner with low communication and operation overhead.

Summary: Intelligent Peer-to-Peer Media Streaming

A framework and system of intelligent streaming live media contents through end host cooperation is disclosed. The invented multimedia content distribution system consists of one media source and a group of peers which dynamically changes with peer arrivals and departures. Those entities form and maintain an overlay network that converges to a global load-balance state to achieve cooperative downloading. Content distribution in this overlay topology further employs an intelligent topology formation algorithm, and an efficient media streaming protocol.

The advantages of the proposed approach are highlighted as follows:
  The intelligent topology formation algorithm is a proactive approach to build a topology with tunable parameters to achieve various objectives.
  The proposed approach achieves equal capacity per degree at each peer.
  The proposed approach allows the media streams to flow smoothly across the network and at the same time fully utilize the spare bandwidth of each peer.
  The proposed approach is a hybrid approach to stream media contents with the advantages of both tree and data-driven structures but without their drawbacks.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 2(a) is an ill-connected network with peers A, B and D's downloading rates restricted to 50. FIG. 2(b) is the link-level homogeneous overlay network formed by our invention where all the links have the bandwidth 100.

FIG. 5 shows the pseudocode of the invented distributed approach using the Metropolis-Hastings algorithm.

DETAILED DESCRIPTION OF THE PREFERRED EMBODIMENTS

Figure 1:
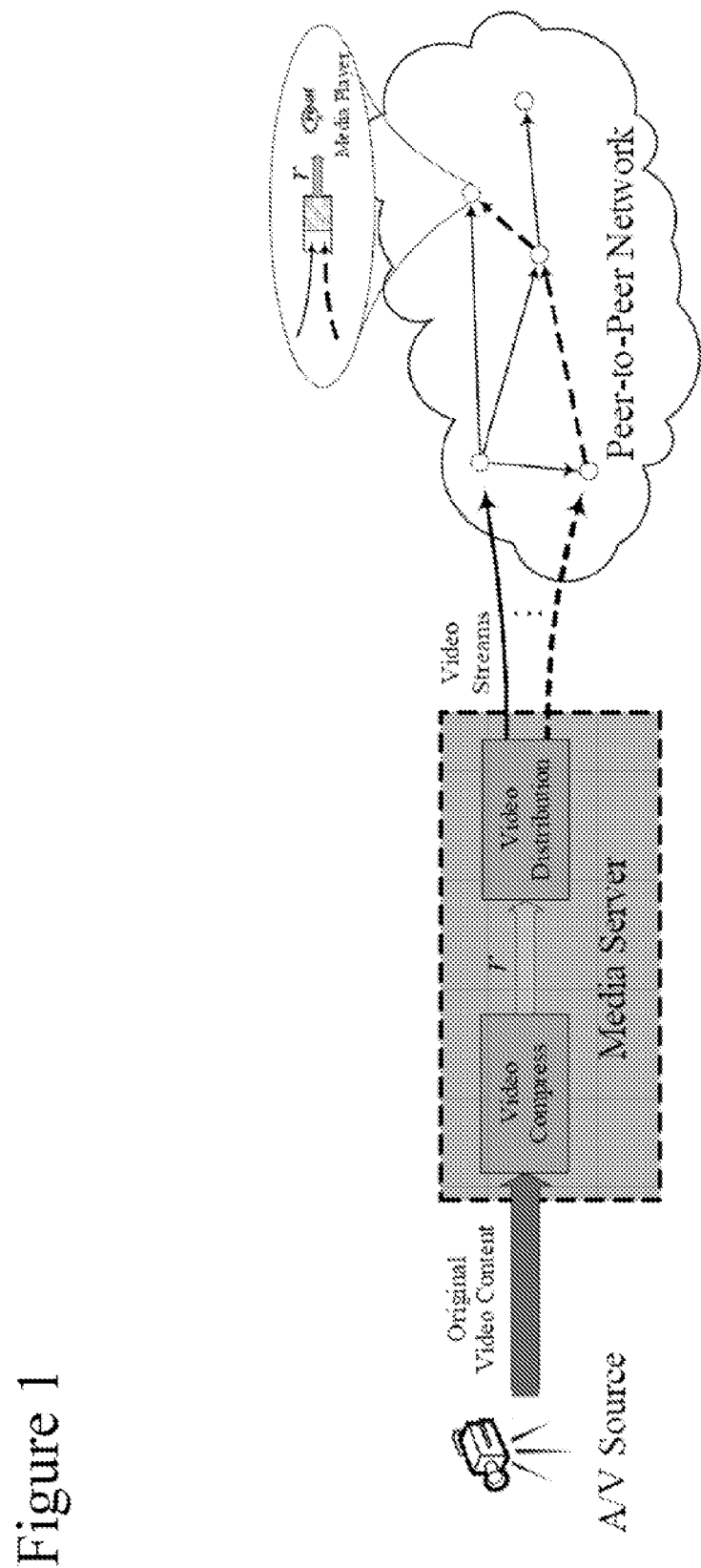
FIG. 1 shows an overview of the live video streaming system in accordance with the preferred embodiment. The original raw content is first generated from the A/V source and then injected into the media server for distribution. The individual user in the overlay network downloads the video content and plays the content at the playout rate r which is determined by the media server.
Figure 2:
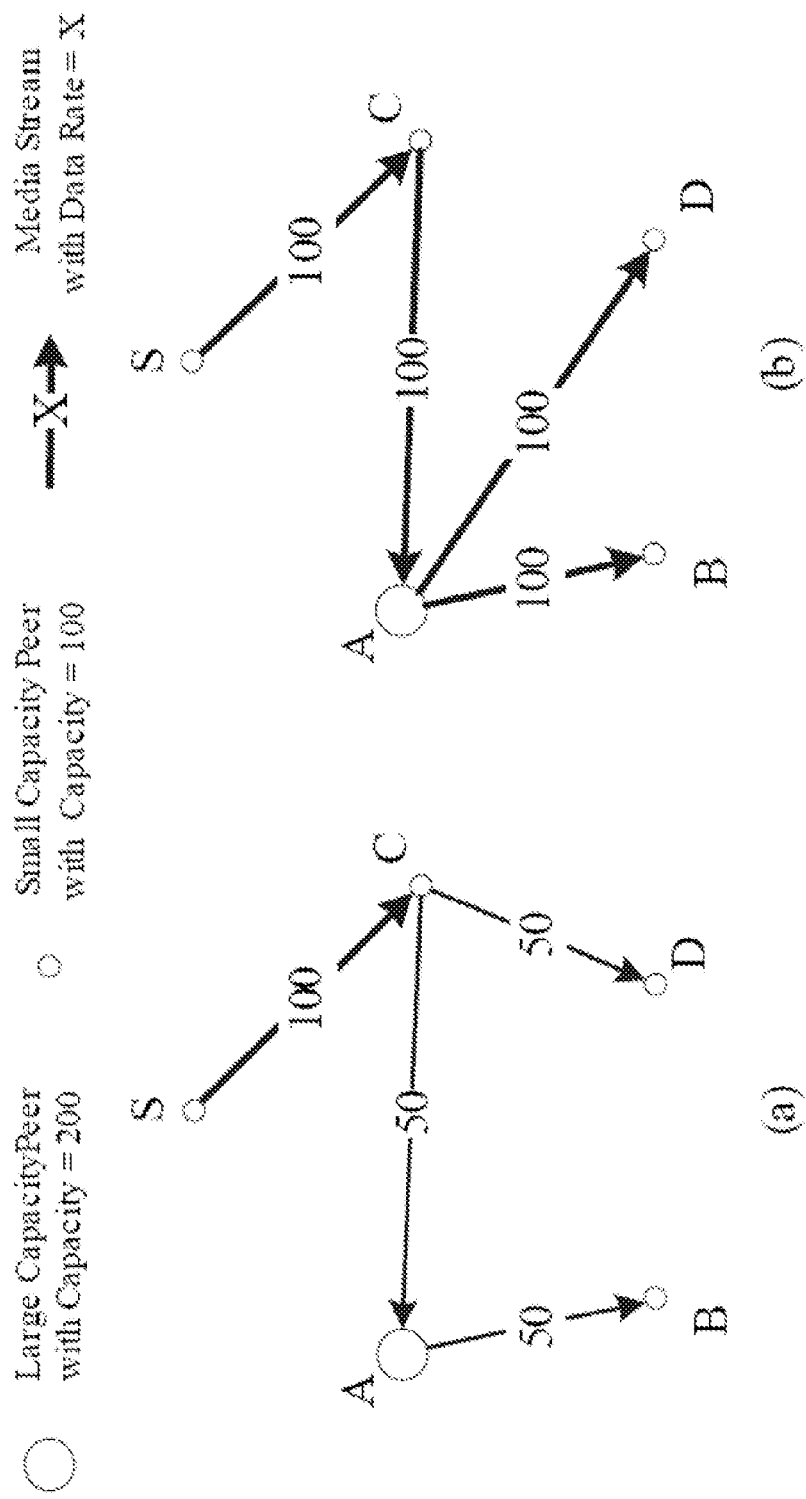
FIG. 2 shows an example of the overlay networks for video distribution, in which S is the media server, A, B, C and D are downloading nodes.

The numerous innovative teachings of the present application will be described with particular reference to the presently preferred embodiment (by way of example, and not of limitation).

To address unpredictable and dynamically changing overall bandwidth problem, the proposed approach dynamically adapts the playout rate in tune with the changes of $\Sigma_{i \in V_t} C_i$. Specifically, the preferred embodiment makes the playout rate r as a function of time denoted by $r_t$, and enables the media source to adoptively control it based on the overall bandwidth resource such that at any time snapshot t, $\Sigma_{i \in V_t} C_t \approx (|V_t|-1) r_t$. Consequently, if the overall bandwidth is not plenty to support all the users with current playout rate, the media server will decrease the playout rate $r_t$ by further compressing the video content. On the other hand, if the overall bandwidth is plenty, the media server will generate high quality video streams with a higher playout rate $r_t$ so that all the peers will benefit from the improved video quality. As a result, not only can the peer-to-peer streaming system adapt to the changes of the network resource without overloading the media server, but also peers can enjoy the best possible video quality all the time.

To address the bandwidth heterogeneity and bottleneck effects problem, the disclosed approach forms an adaptive load-balance topology. Here, the number of out-going connections of peers is automatically adapted based on their upload bandwidth and the adequacy of the overall bandwidth. As a result, peers are balanced in uploading workload and all the overlay connections converge to equal bandwidth to achieve a global load-balance state as the link-level homogeneity. With no peers performing as bottlenecks in this desirable state, full bandwidth utilization is achieved and peers can download at the satisfactory rate.

Meanwhile, in this link-level homogenous state, since the workload of the server is also adapted and related to $\Sigma_{i \in V_t} C_i$, the server can estimate the average downloading rate of peers and adaptively tune the playout rate $r_t$ by observing its own transmission workload only.

To achieve low cost and effective adaptation highly dynamic system, the proposed system is formed in the same spirit of the incremental update. Specifically when a node joins or departs from the network, only some local nodes affected by connection or disconnection update the local overlay graph, whereas all the other nodes remain unchanged. Therefore, the adaptation of the overlay network involves only some affected neighboring nodes without disturbing the other nodes. Moreover, the proposed system can converge fast to the desired link-level homogeneous state and work efficiently in the high churning systems.

Incorporating with the overlay topology adaptation, the adaptation of the playout rate is open-loop. In other words, the server can timely tune the playout rate based on its local information only and no any feedback signals are required from the overlay networks.

The preferred embodiment of the present inventions and their advantages are best understood by referring to FIGS. 1 through 5 of the drawings. Without loss of generality, the teaching considers one multicast session (or video channel) so that all the peers are watching or downloading the same video content. However, the application does not limit to one multicast session, and one skilled in the art should easily apply the teaching to multiple multicast sessions.

The Basic Structure of the Overlay Network

The teaching nodes the overlay network as a directed graph $G_t = \{V_t, E_t\}$ at each time snapshot t. $V_t$ denotes the set of peers, including the source node. Et denotes the set of overlay connections and $E_t \subset V_t \times V_t$. $\mathscr{P}_{i,t}$ denotes the set of peer i's parent nodes which upload video streams to peer i. And $\mathscr{C}_{i,t}$ denotes the set of peer i's child nodes which download video streams from peer i. The in-degree of node i is denoted by $I_i = |\mathscr{P}_{i,t}|$. The out-degree of node i is denoted by $O_i = |\mathscr{C}_{i,t}| C_i$ denotes the upload capacity of peer i. The media source is regarded as a normal peer which always stays in the network with in-degree constantly equal to 0.

This teaching makes the following two assumptions.

First, random linear network coding is implemented in the system. With network coding, instead of forwarding the received video streams directly, each peer sends the coded video streams which are the linear combinations of its downloading video streams. The information is evenly spread in the coded streams and is always useful to the receiving node. Therefore, each node is always able to retrieve the non-redundant video streams from any selected parent nodes in the overlay. This assumption enables the teaching to focus on constructing the overlay topology. However, with the generality of the achieved link-level homogeneous property, the disclosed approach can also be combined with other coding methods such as Multiple Description coding and Fountain Code, as well as the tree-based or block-oriented schemes to facilitate efficient video delivery.

Second, the teaching assumes that the transmission bottleneck is always in the first hop of the uploading side, rather than inside the network core or on the downloading side. This is due to the widely adoption of broadband networks and asymmetric access links of users. With this assumption, the teaching calculates the bandwidth of the out going connections of a peer $i \in V_t$ as $$\frac{C_i}{O_i}$$

and proposes to adapt peers' out-degrees proportional to their upload bandwidth in the highly dynamic overlay. Finally, in the global network, $$\frac{C_i}{O_i}$$

converges to a same constant $i \in V_t$ and therefore all the overlay connections aim to achieve the same bandwidth, i.e., link-level homogeneity.

Construction of Overlay Backbone

The disclosed approach forms a link-level homogeneous overlay topology that takes advantage of the upload bandwidth of all the participating peers as much as possible and evenly allocates the upload workload to peers. Various classes of embodiments are available. This teaching discusses two of them: one proposes a centralized at algorithm which can be implemented in small size networks with hundreds of peers involved and another is a completely distributed algorithm which is based upon the main idea of the centralized algorithm for large-scale network.

Centralized Approach

This class of embodiment assumes that a central controller is available. The controller has the global information, including the addresses of all the participating peers, their upload bandwidth values and their current out-degrees.

Peer Joining When a peer, e.g., peer j, joins at t, to connect it to the overlay graph, the controller sorts the existing peers in a descending order according to their capacity per out-degree values as $$\left\{\frac{C_{i_1}}{O_{i_1}}, \frac{C_{i_2}}{O_{i_2}}, \ldots, \frac{C_{i_{|V_t|}}}{O_{i_{|V_t|}}}\right\}$$

where $$\frac{C_{i_1}}{O_{i_1}} \geq \frac{C_{i_2}}{O_{i_2}} \geq \ldots \geq \frac{C_{i_{|V_t|}}}{O_{i_{|V_t|}}}.$$

For those nodes with out-degree equal to 0, we manually set their out-degree values to be $\epsilon$ in computing the capacity per out-degree value where $\epsilon$ is a constant and $0 < \epsilon \leq 1$. After that, the controller will choose from the ordered list the first $I_j$ peers which are $$\left\{\frac{C_{i_1}}{O_{i_1}}, \frac{C_{i_2}}{O_{i_2}}, \ldots, \frac{C_{i_{I_j}}}{O_{i_{I_j}}}\right\}$$

as the parent nodes of peer j, where $I_j$ is specified j peer. After peer j is connected into the network its out-degree is 0 and its downloading rate can be up to the sum of the capacity per out-degree values of all its parent nodes.

Peer Rebuilding When a peer, e.g., peer j, departs from the network, each of its child nodes will lose a downloading link. Accordingly, these child nodes' downloading rates will decrease. To compensate for the loss, the server will rebuild one link for each of them. The rebuilding procedure is similar to the joining procedure. With each rebuilding, only the peer currently with the largest capacity per out-degree value is chosen to be connected as the parent node. Using the centralized algorithm, in the stable state where peers join and depart from the network at the same rate, the capacity per out-degree values of all live nodes converge to the same equilibrium value $\delta_C$, i.e., $$\delta_C = \lim_{t \to \infty} \frac{C_i}{O_i}, \forall i \in V_t \quad (1)$$

where $$\delta_C = E\left(\frac{\sum_{i \in V_t} C_i}{\sum_{i \in V_t} O_i}\right) \quad (2)$$

Figure 3:
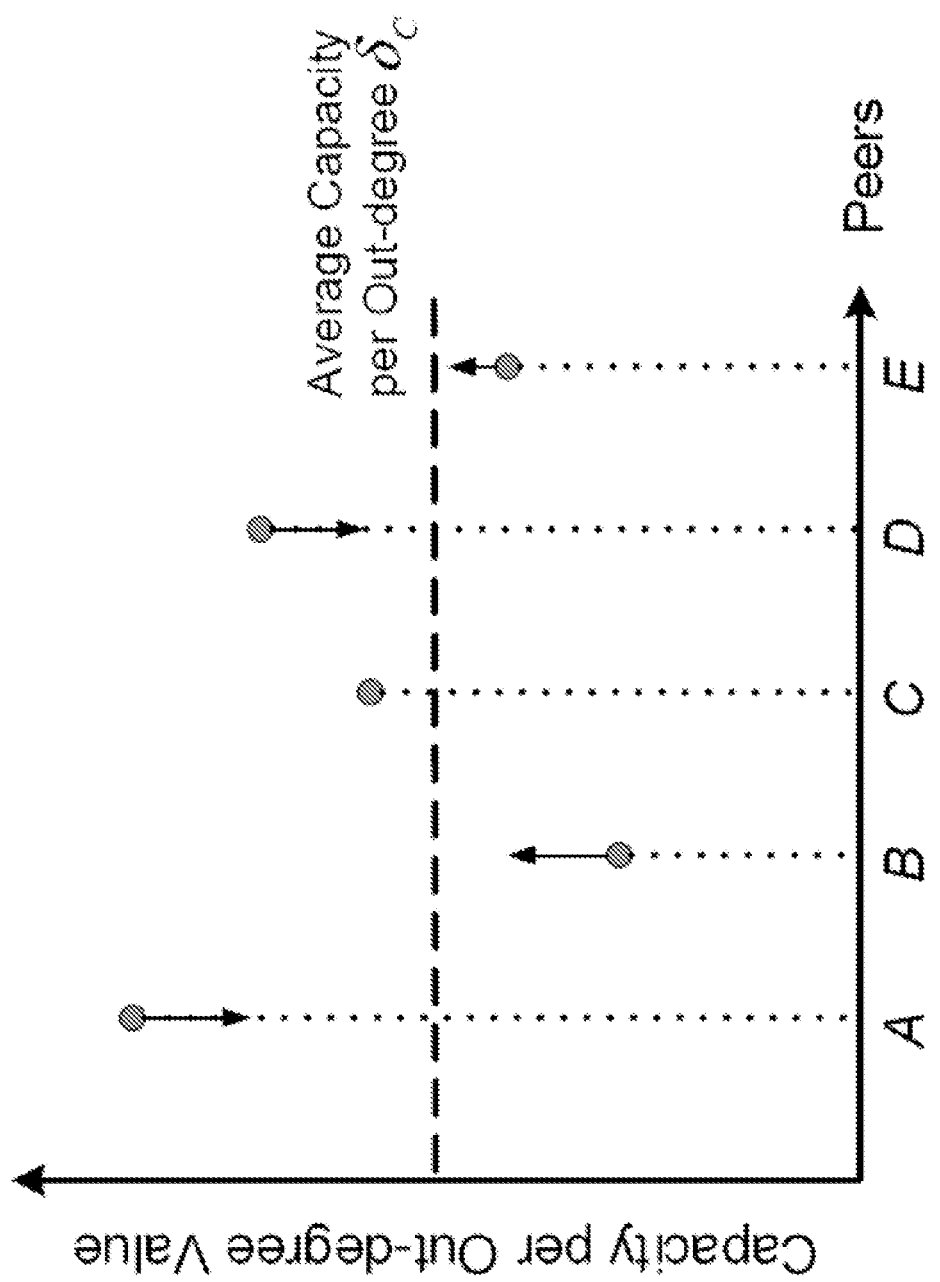
FIG. 3 shows an illustrative example of the convergence of the capacity per fanout of nodes using our invention.

FIG. 3 illustrates a simple example. Suppose that the network currently has 5 participating peers A, B, C, D and E with their capacity per out-degree values shown in FIG. 3. Suppose that peer j joins in the network with $I_j = 2$. In this case, A and D will be chosen as the parent nodes since they currently have the largest capacity per out-degree values. By adding one more out-going connection to peer j, both peers A and D's capacity per out-degree values will be reduced accordingly. On the other hand, the capacity per out-degree value of peers B and E can also increase when their child nodes depart. As peers continuously join and depart, the capacity per out-degree values of all the peers will finally converge to the same value $\delta_C$. Our simulations validated this effect.

Open-loop Playout Rate Adaptation By using the centralized algorithm, with each peer $j \in V_t$, having $I_j$ incoming connections and each connection downloading at the rate $\delta C$, the downloading rate of peer j is therefore $\delta_C I_j$. However, in order to ensure that all the users can play the video smoothly, the playout rate $r_t$ must be no larger than the smallest downloading rate of peers. In other words, peers with the smallest in-degree will become the bottlenecks in terms of the playout rate. For this reason, the preferred embodiment enforces that all the peers have the same in-degree value, i.e., $I_j=m$, $\forall j \in V_t$. In this case, from Eqn (2), all the peers cart have the same downloading rate $d_C$ as $$d_C = \delta_C m = E\left(\frac{\sum_{i \in V_t} C_i}{|V_t|-1}\right) \quad (3)$$

$$\text{with } \sum_{i \in V_t} O_i = \sum_{i \in V_t} I_i = (|V_t|-1)m.$$

Since the media source is also involved in the centralized algorithm, its capacity per out-degree value will also converge to the global equilibrium $\delta_C$. Therefore, it can simply estimate the downloading rate of peers by observing its own capacity per out-degree value at time t, denoted by $\delta_t^x$, and multiplying this value by m. In this case, it can adaptively tune the playout rate with $$r_t = \delta_t^S m \approx d_C = E\left(\frac{\sum_{i \in V_t} C_i}{|V_t|-1}\right) \quad (4)$$

Distributed Approach

The disclosed approach forms a link-level homogeneous overlay topology distributively. Here we use V to denote $V_t$, $\eta_i$ to denote $C_i$, and $k_i$ to denote $O_i$. We assume that there is a central entity namely Rendezvous Point (RP) to help new peers join the network, just like the tracker in BitTorrent. The RP's IP address is public and known by peers. Upon joining Into the network, each node, e.g., peer i will contact the RP and fetch the peer list containing a set of nodes, denoted by $V_t$.

Construction of Overlay Backbone

The topology formation algorithm is used to form the overlay backbone of the system on which the media contents are then streamed. The basic idea is: after being bootstrapped in the network by RP, the new peer will select an active peer i in the network to connect with the target probability $\pi(i)$, $$\pi(i) = \frac{\frac{\eta_i^\alpha}{k_i^\beta}}{\sum_{j \in V} \frac{\eta_j^\alpha}{k_j^\beta}} \quad (1)$$

where $\alpha$ and $\beta$ are used for "matching" a wide range of overlay applications in terms of peer's workload. Roughly speaking, if $\alpha$ is small and $\beta$ is large, the node degree would increase slowly. If $\alpha$ is large and $\beta$ is small, then the node degree would increase fast. The concrete value of $\alpha$ and $\beta$ can be tuned adaptively according to the various QoS requirements in different systems, and more particularly the preferred embodiment chooses $\alpha=2$ and $\beta=1$ to achieve the link-level homogeneity where such that $$\frac{\eta_i}{k_i}$$

is a constant.

The new approach discloses how to connect the new arrivals to the appropriate peers following the target distribution in (1) via a decentralized manner. The main procedures are (a) joining procedure and (b) rebuilding procedure.

a) Joining Procedure

Figure 4:
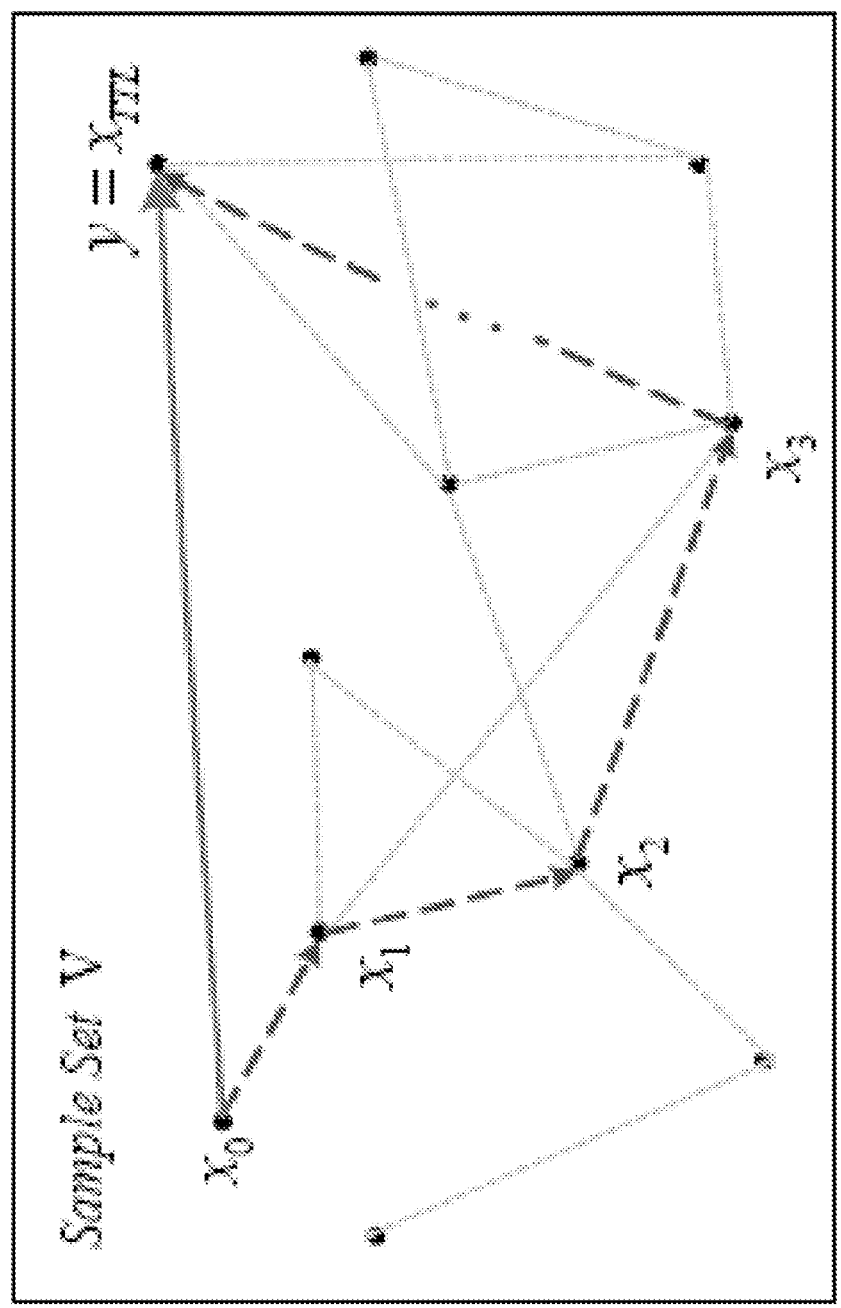
FIG. 4 shows an example of the trace of the walkers in the overlay. The walker is issued by peer $x_0$ and stops at peer y.

When a new peer, x, joins the network, it will randomly choose $m_x$ peers in $V_x$ and issue one walker to each of them. These random walkers will be passed among peers based on the invented algorithm. Each walker is assigned a time-to-live (TTL) value, $\tau$. The walker is forwarded from the current node to a neighboring note based on the proposed edge transition probability and the walker's TTL is decremented by one after each forwarding. The new node connects to a node at which the walker stops (i.e. TTL=0). If a walker stops at the node which is already connected by that new node, then the walker moves additional steps, e.g., one step. FIG. 4 shows an example of the process and Algorithm 1 in FIG. 5 presents details. Next, the designing philosophy of the edge transition probability P(j, i), i.e., the probability that the walker is forwarded to peer j by peer i, is discussed.

The transition probability, P(j, i), with which the walker is now staying at peer t and will be forwarded to peer $j \in V_t$, is $$P(j,i)=q(j,i) \cdot \alpha(j,i) \quad (2)$$

where q(j, i) i is called selection probability, i.e., the probability peer j is selected by peer i from its neighbor list as the candidate to forward the walker. $\alpha(j, i)$ is called acceptance probability, i.e., the probability that candidate j will finally be accepted as the next station to receive the walker. The selection probability is flexible and can be proposed differently according to the actual network environments. One proposal is, $$q(j,i) = \frac{1}{\tilde{k}_i + 1} \quad (3)$$

where $\tilde{k}_i = |V_i|$.

The acceptance probability $\alpha(j, i)$ is defined as, $$\alpha(j,i) = \min\left\{\frac{\pi(j) \cdot q(i,j)}{\pi(i) \cdot q(j,i)}, 1\right\} \quad (4)$$

$$= \min\left\{\left(\frac{\eta_j}{\eta_i}\right)^\alpha \cdot \left(\frac{k_i}{k_j}\right)^\beta \frac{\tilde{k}_i+1}{\tilde{k}_j+1}, 1\right\}$$

With such a definition of $\alpha(j, i)$, a superior neighbor j with more available resource j (e.g., uplink bandwidth) and smaller degree $\tilde{k}_j$ will be chosen with algorithm with the ability to probe deep in the network and dig out these hidden matching peers. The later, however, will inevitably be trapped at a local optimal peer. The integrated transition probability P(j, i) defined in (2) is then, $$P(j, i) = \begin{cases} \frac{1}{\tilde{k}_i + 1} \min\left\{\left(\frac{\eta_j}{\eta_i}\right)^\alpha \cdot \left(\frac{k_i}{k_j}\right)^\beta \frac{\tilde{k}_i + 1}{\tilde{k}_j + 1}, 1\right\}, & i \neq j, j \in V_i, \quad (5a) \\ 1 - \sum_{j' \in V_i, j' \neq i} P(j', i), & j = i. \quad (5b) \end{cases}$$

The preferred embodiment has adopted a sampling method to choose matching peers with the so called transition probability, the larger the sample set, i.e., $\tilde{k}_i$, is at each stop i; the better the algorithm will perform. The perferred embodiment adopts $20 \leq \tilde{k}_i \leq 50$. To achieve this, each peer i can fetch the peer list $V_t$ from the RP as soon as its $\tilde{k}_i$ is smaller than 20.

b) Rebuilding Procedure

To fight the churn of peers, it is necessary to repair the constructed topology to prevent network breakdown and node isolation. The repairing process is called rebuilding procedure, which can be done with following rebuilding schemes.

Rebuilding Schemes

When a node leaves the network, all of its neighbors lose a link. The reactive rebuilding scheme is invoked passively only when a peer i lost a link. To guarantee their connectedness, those nodes which lost a link will then rebuild a new link(s) with probability $r_i$ to compensate for the lost one. When a node i tries to rebuild a link, it issues a walker with a TTL value, $\tau$, to one of the peers in $V_i$. The walker then traverses the network, same as that in the node joining process. Finally, a new link is created by connecting node i and the node at which the walker stops. Three representative rebuilding process schemes are described here (in the following, $k_t'$'s denotes the degree of node i just after losing a link).

Always Rebuilding Scheme: The nodes always rebuild one link to compensate for each lost link, i.e. $r_i=1$ for every node i.

Probabilistic Rebuilding Scheme: The nodes rebuild a link based on a probability r, Mathematically $$r_i = \begin{cases} 1, & k_i' = 2 \quad (6a) \\ r, & k_i' \geq 3 \quad (6b) \end{cases}$$

for every node i. The threshold on $k_i'=3$ means that each node has to maintain at least three links to ensure network connectedness.

Adaptive Rebuilding Scheme: The nodes gradually rebuild links when their degrees are getting large in order to prevent overloading. At the same time, each node i should maintain at least m, links such that the overlay service performance and reliability are not degraded. Therefore, this rebuilding process allows the nodes to make rebuilding decision adaptive by considering their current degrees.

Mathematically, $$r_i = \min\left\{\frac{m_i - 1}{k_i}, 1\right\} \quad (7)$$

for each node i.

C. Link Level Homogeneity

The term "Link Level Homogeneity" refers to the property that each virtual link is of the same service power. More specifically, in a link level homogeneous network G, $\forall i \in V$, there is $$\frac{\eta_i}{k_i} = \delta_C,$$

where $\delta_C$ is $$\delta_c = \sqrt{\frac{\mu Z}{\lambda m |V|}} \quad (10)$$

where $$Z = \sum_{i \in V} \frac{\eta_i^2}{k_i},$$

$\lambda$ is the mean arrival rate of peers and $\mu$ is the mean departure rate of peers. (10) is achieved without considering the rebuilding procedure. An obvious advantage of the so-called link level homogeneity is that peers in the network are interconnected with media pipes of equal bandwidth. Media streams conducted on these pipes can thus flow smoothly and well-proportioned and will not encounter bottlenecks. In such a scenario, peers at the downstream will not suffer from the poor service capability of the upstream peers and how to organize the heterogeneous peers is thus solved perfectly. What is more, thanks to our proactive topology formation algorithm, once a peer is connected to the network, a peer can achieve matched service from others and therefore do not need to modify its local topology to accommodate the heterogeneous network any more. Since these reactive modifications will not only degrade its own video quality, but also its children's, by avoiding the churning procedure, our system is thus more steady-going and suitable for rigorous QoS requirements.

Distributed Call Admission Control

In the previous presentation, we assume that the video playout rate $r_t$ can be adaptively tuned based on the adequacy of the overall bandwidth resource in the system. However, in some applications, if $r_t$ can not be turned, we further propose a distributed call admission control mechanism so that the Necessary Condition of a feasible network is always satisfied. This distributed call admission control mechanism can be implemented in either the centralized topology formation approach or the distributed approach.

Specifically, using our mechanism, downloading rate of peers, $d_C$, can be estimated by each individual peer, just like the server using equations (3) and (4). In this case, in order to meet the Necessary Condition, we must guarantee that the estimated downloading rate of peers is larger than the fixed playout rate. In a nutshell, using the distributed call admission control mechanism, by estimating the adequacy with local information, each node makes the decision locally whether to accept and serve the new peers or not.

For example, suppose that a node j joins the network and selects peer i as its parent nodes, where i can be selected using either the presented centralized approach or distributed approach. To make the decision whether to serve peer j or not, peer i first estimates its own capacity per fanout at current time, denoted as $\delta_t^i$. With $\delta_t^i$, peer i can estimate the adequacy of the overall bandwidth resource by computing the expected downloading rate of peers as $d_c = m\delta_t^i$. With this information, if $d_c \leq \zeta r$, peer i will admit peer j $C_j \geq r$ and reject it otherwise. On the other hand, $d_c > \zeta r$, peer i will always admit peer j regardless peer j's uploading bandwidth. $\zeta$ is predefined and used to control the robustness of the system. If $\zeta$ small, the system is greedy to involve peers in the system but it may hurt the downloading performance of peers. If $\zeta$ is too large, the system is conservative and will reject peers even there is abundant resource available in the system.

According to various disclosed embodiments, there is provided: A method of distributing high-bandwidth content over a peer-to-peer network, comprising: when a peer joins the network, launching a walker procedure which explores the current network topology to find exiting nodes which can provide the best connectivity to the peer; and connecting the new peer to at least one tree within the network, in dependence on the results of said walker procedure, to thereby receive content streams.

According to various disclosed embodiments, there is provided: A method of distributing high-bandwidth content over a peer-to-peer network, comprising; when a peer joins the network launching a walker procedure which explores the current network topology to find exiting nodes which can provide the best connectivity to the peer, individual substreams which in combination provide a single high-bandwidth data stream; and connecting the new peer to at least one tree within the network, in dependence on the results of said walker procedure, to thereby receive content.

According to various disclosed embodiments, there is provided: A peer-to-peer network method for multi-media distribution, comprising the actions of: monitoring the overall bandwidth resource availability; dynamically adapting playout rate at the media source in dependence of said overall bandwidth; and forming and maintaining an adaptive load-balancing topology such that the number of outgoing connections of ones of peers in the network is automatically adapted in dependence of its upload bandwidth and said over-all bandwidth.

According to various disclosed embodiments, there is provided: A peer-to-peer network method for multi-media distribution, comprising the actions of: supplying a playout stream at a media source; forming and maintaining an adaptive load-balancing topology such that the number of outgoing connections of ones of peers in the network is automatically adapted in dependence on its upload bandwidth and said overall bandwidth, while locally applying call admission criteria which avoid network degradation.

According to various disclosed embodiments, there is provided: A network architecture for peer-to-peer communications, comprising: a media source which plays out media content at an adaptive rate in dependence of its capacity per out-degree value; and a peer-to-peer network comprising said media source as a peer and at least one other peer; wherein ones of said peers connect to other said peers for downloading said content; and said network dynamically selects a certain said peer with preference in dependence on capacity per out-degree values to connect a new peer for downloading and updates connections locally in response to at least some events; whereby the capacity per out-degree values of all said peers in said network converge to substantial uniformity.

According to various disclosed embodiments, there is provided: A network architecture for peer-to-peer communications, comprising: a media source as a peer; and at least one other peer; an overlay network where said media source plays out media content at an adaptive rate in dependence of its capacity per out-degree value and ones of said peers but not said media source connects to other said peers for downloading said content and the capacity per out-degree values of all said peers in said network converge to a substantially same value; and a network comprising all said peers including said media source; wherein ones of connections in said network are constructed in dependence on transition probability, and out degrees of said peers are larger than one value X but smaller than another value Y; and a new peer joins said network by randomly connecting to a medium number, between said X and Y, of said peers, and joins said overlay network by propagating requests through said network in searching, in dependence on said transitional probability, for peers with preferred capacity per out-degree values to connect to.

According to various disclosed embodiments, there is provided: A network architecture for peer-to-peer communications, comprising: a media source which plays out media content into a peer-to-peer network, said network including peers which connect to other said peers for downloading said content; and local node selection procedures which assign data download sources to new nodes in at least partial dependence old capacity per out-degree values.

According to various disclosed embodiments, there is provided: A network architecture for peer-to-peer communications, comprising: a media source which plays out media content into a peer-to-peer network said network including peers which connect to other said peers for downloading said content; and a walker procedure, locally executable by nodes of the network, which explores the current network topology to find existing nodes which can provide the best connectivity to a newly joined or rejoined peer.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. Many variations are noted above, and many others are possible.

For example, in some embodiments the transitions of the walker can be deterministic rather than stochastic. An in stance of this would be a walker which transitions only to the first-found adjacent node having the highest fanout-scaled available bandwidth.

For example, in some embodiments the transitions of the walker can be deterministic rather than stochastic. An instance of this would be a walker which transitions only to the first-found adjacent node having the highest fanout-scaled available bandwidth.

It should be noted that the node evaluation criteria used by the walker do not have to be precisely accurate measurements of node optimality, since the overall process has enough stochasticity to achieve good optimization anyway.

For another example, a variety of rules can be used for stopping the walker procedure. One simple rule is to allow each walker a fixed number of transitions, but another is to stop when a walker has made some fixed number of transitions without improving on the best node previously found.

For another example, in some embodiments the walker procedure can be avoided, by using a centralized approach as described above.

For another example, a variety of rules can be used to guarantee transition of the walker procedure from node to node without stalling or spawning.

For another example, initial nodes for launch of the walker procedures can be launched in a variety of ways, including random selection or otherwise.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A computer implemented method for distributing high-bandwidth content over a peer-to-peer network, comprising:
    determining at least one parameter, of a steady-state distribution function, based upon facilitating convergence to link-level homogeneity of a network configured for content distribution, including defining the at least one parameter based upon at least one target quality-of-service (QoS) requirement for the peers in the network;
    initiating a walker procedure for exploring at least a portion of the network, wherein at least one result of the walker procedure facilitates probabilistically selecting peers in the network in accordance with a target probability of the steady-state distribution function;
    selecting, using a processor of the computer, at least one tree within the network based upon the at least one result of the walker procedure; and
    connecting a new peer to the at least one tree based upon capacity.

2. The method of claim 1, wherein initiating the walker procedure includes initiating the walker procedure in the network having dynamic peer arrivals and departures with unpredictable arrival of new peers and unpredictable departure of exiting peers.

3. The method of claim 1, further comprising defining at least one parameter of the steady-state distribution function based upon a determined topology of the network.

4. The method of claim 1, further comprising maintaining identical bandwidth on respective links between peers to facilitate achieving link-level homogeneity in the network.

5. The method of claim 1, wherein defining the at least one parameter includes defining the at least one parameter based upon QoS requirements associated with at least one of capacity or degree of the peers in the network explored by the walker procedure.

6. The method of claim 1, further comprising deriving transition probabilities from the target probability and applying the walker procedure to select the peers in a distributive manner.

7. The method of claim 1, further comprising defining the steady-state distribution function as:

$$\pi(i) = \frac{\frac{\eta_i^\alpha}{k_i^\beta}}{\sum_{j \in V} \frac{\eta_j^\alpha}{k_j^\beta}},$$

where $\pi(i)$ is the target probability, $\eta_i$ relates to communication capabilities of peer i with respect to serving other peers, $k_i$ relates to a workload of peer i as a result of serving other peers, and $\alpha$ and $\beta$ relate to parameters associated with a target quality-of service (QoS) requirement.

8. The method of claim 1, wherein the connecting the new peer is a result of a join procedure or the connecting the new peer is a result of a rebuild procedure.

9. The method of claim 1, further comprising denying the connecting in response to a locally estimated downloading rate for the new peer that is smaller than a threshold playout rate.

10. A computer implemented method for distributing high-bandwidth content over a peer-to-peer network, comprising:
    determining at least one parameter, of a steady-state distribution function, based upon facilitating convergence to link-level homogeneity of a network configured for content distribution, including determining the at least one parameter based upon at least one target quality-of-service (QoS) requirement for the peers in the network;
    performing a walker process including probabilistically exploring at least a portion of the network, wherein the walker process facilitates selecting peers in the network probabilistically based upon an available bandwidth per fanout subject to a target probability of the steady-state distribution function;
    selecting, using a processor of the computer, at least one tree within the network based upon results of the walker process; and
    connecting a new peer to the at least one tree subject to capacity of the new peer.

11. The method of claim 10, further comprising, during the walker process, transitioning between peers with potentially higher available bandwidth per fanout.

12. The method of claim 10, wherein performing the walker process includes performing the walker process in the network having dynamic peer arrivals and departures with unpredictable arrival of new peers and unpredictable departure of exiting peers.

13. The method of claim 10, further comprising determining at least one parameter of the steady-state distribution function based upon a desired topology of the network.

14. The method of claim 10, further comprising maintaining identical bandwidth on respective links between peers to facilitate achieving link-level homogeneity in the network when virtual links between peers are of a same service power.

15. The method of claim 10, wherein the determining includes determining the at least one parameter based upon QoS requirements associated with at least one of capacity or degree of the peers in the network explored by the walker process.

16. The method of claim 10, further comprising deriving transition probabilities from the target probability and applying the walker process for selecting the peers in a distributive manner.

17. The method of claim 10, wherein the connecting the new peer is a result of a join procedure or a rebuild procedure.

18. The method of claim 10, further comprising preventing the connecting when a locally estimated downloading rate for the new peer is smaller than a threshold playout rate.

19. A computer implemented system that facilitates peer-to-peer network communication, comprising:
    a media source node configured to transmit content to a set of connected nodes by way of a network, wherein the network is a dynamic peer-to-peer network;
    an exploration component that involves a walker procedure, locally executable by the set of connected nodes, wherein the walker procedure facilitates probabilistically selecting at least a portion of the set of connected nodes in accordance with a target probability of a steady-state distribution function, wherein the target probability is determined as a function of at least one parameter of the steady-state distribution function, wherein the at least one parameter is based on at least one target quality-of-service (QoS) requirement for the peers in the network, and wherein the at least one parameter of the steady-state distribution function facilitates convergence to link-level homogeneity of the network;

a selection component, executed by a processor of the computer, that selects an existing node from the at least a portion of the set of connected nodes based upon results of the walker procedure; and an authorization component configured to grant a new node access to connect to the existing node.

20. The system of claim 19, wherein the network is dynamic with unpredictable arrival of new peers and unpredictable departure of exiting peers.

21. The system of claim 19, wherein the at least one parameter is associated with a desired topology for the network.

22. The system of claim 19, wherein the at least one QoS requirement is based on at least one of capacity or degree of peers explored by the walker procedure.

23. The system of claim 19, wherein the walker procedure employs the target probability to select peers in a distributive manner, and wherein transition probabilities are derived from the target probability.

24. The system of claim 19, wherein the authorization component grants access to the new node as a result of a join procedure.

25. The system of claim 19, wherein the authorization component grants access to the new node as a result of a rebuild procedure.

26. The system of claim 19, wherein the authorization component denies access to the new node if a locally estimated downloading rate for the new node is smaller than a threshold playout rate.

* * * * *